(12) United States Patent  
Thomas

(10) Patent No.: US 11,714,902 B2
(45) Date of Patent: *Aug. 1, 2023

(54) USE OF AN APPLICATION CONTROLLER TO MONITOR AND CONTROL SOFTWARE FILE AND APPLICATION ENVIRONMENTS

(71) Applicant: Sophos Limited, Abingdon (GB)

(72) Inventor: Andrew J. Thomas, Oxfordshire (GB)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,996

(22) Filed: Feb. 4, 2022

(65) Prior Publication Data

US 2022/0156373 A1   May 19, 2022

Related U.S. Application Data

(63) Continuation of application No. 16/692,599, filed on Nov. 22, 2019, now Pat. No. 11,244,049, which is a
(Continued)

(51) Int. Cl.
*G06F 21/56*  (2013.01)
*G06F 21/62*  (2013.01)
*H04L 9/40*   (2022.01)

(52) U.S. Cl.
CPC .............. *G06F 21/56* (2013.01); *G06F 21/62* (2013.01); *H04L 63/107* (2013.01); *H04L 63/1408* (2013.01)

(58) Field of Classification Search
None
See application file for complete search history.

(56) References Cited

U.S. PATENT DOCUMENTS

| 7,137,034 B2 | 11/2006 | Largman et al. |
| 7,392,541 B2 | 6/2008  | Largman et al. |

(Continued)

FOREIGN PATENT DOCUMENTS

| WO | WO-2003067435 A2 | 8/2003 |
| WO | WO-2013082437    | 6/2013 |

OTHER PUBLICATIONS

USPTO, "U.S. Appl. No. 15/729,306 Final Office Action dated Feb. 14, 2019", 21 pages.
(Continued)

*Primary Examiner* — Benjamin E Lanier
(74) *Attorney, Agent, or Firm* — Strategic Patents, P.C.

(57) ABSTRACT

In embodiments of the present invention, a framework for an extensible, file-based security system is described for determining an appropriate application, application environment, and/or access or security control measure based at least in part on a file's reputation. In response to the selection of a file, an application controller may be used to select a software application from two or more software applications to open the selected file, based at least in part on the selected file's reputation. If launched, a software application may be configured to open the file in an environment, such as a virtual machine, quarantined environment, and the like, that is appropriate for the file based at least in part on the reputation information. A software application may be a secure software application configured to manage secure files, or an insecure software application configured to manage insecure files. The selected file, and communications relating to the selected software application, may be managed according to the selected software application's secure or insecure configuration. Further, the selected software application may associate reputation information with all files that are modified and/or created by the selected
(Continued)

software application, including at least in part, reputation information matching that of the selected file.

20 Claims, 7 Drawing Sheets

Related U.S. Application Data continuation of application No. 15/729,306, filed on Oct. 10, 2017, now Pat. No. 10,515,211, which is a continuation of application No. 15/194,847, filed on Jun. 28, 2016, now Pat. No. 9,852,292, which is a continuation of application No. 12/751,087, filed on Mar. 31, 2010, now Pat. No. 9,390,263.

(56) References Cited

U.S. PATENT DOCUMENTS

| | | |
|---|---|---|
| 7,536,598 B2 | 5/2009 | Largman et al. |
| 7,571,353 B2 | 8/2009 | Largman et al. |
| 7,577,871 B2 | 8/2009 | Largman et al. |
| 7,788,699 B2 | 8/2010 | Largman et al. |
| 7,849,360 B2 | 12/2010 | Largman et al. |
| 8,181,244 B2 | 5/2012 | Boney |
| 8,201,243 B2 | 6/2012 | Boney |
| 8,214,490 B1 | 7/2012 | Vos et al. |
| 8,225,406 B1 | 7/2012 | Nachenberg et al. |
| 8,418,250 B2 | 4/2013 | Morris et al. |
| 8,719,932 B2 | 5/2014 | Boney |
| 8,726,389 B2 | 5/2014 | Morris et al. |
| 8,763,123 B2 | 6/2014 | Morris et al. |
| 8,775,369 B2 | 7/2014 | Largman et al. |
| 8,819,225 B2 | 8/2014 | Wang et al. |
| 8,839,422 B2 | 9/2014 | Ghosh et al. |
| 8,856,505 B2 | 10/2014 | Schneider |
| 8,856,782 B2 | 10/2014 | Ghosh et al. |
| 8,935,733 B2 | 1/2015 | Igoe |
| 9,081,959 B2 | 7/2015 | Ghosh et al. |
| 9,098,698 B2 | 8/2015 | Ghosh et al. |
| 9,270,697 B2 | 2/2016 | Ghosh et al. |
| 9,390,263 B2 | 7/2016 | Thomas |
| 9,413,721 B2 | 8/2016 | Morris et al. |
| 9,436,822 B2 | 9/2016 | Ghosh et al. |
| 9,519,779 B2 | 12/2016 | Ghosh et al. |
| 9,531,747 B2 | 12/2016 | Stavrou et al. |
| 9,578,045 B2 | 2/2017 | Jaroch et al. |
| 9,602,524 B2 | 3/2017 | Ghosh et al. |
| 9,846,588 B2 | 12/2017 | Ghosh et al. |
| 9,871,812 B2 | 1/2018 | Ghosh et al. |
| 10,043,001 B2 | 8/2018 | Ghosh et al. |
| 10,257,224 B2 | 4/2019 | Jaroch et al. |
| 10,515,211 B2 | 12/2019 | Thomas |
| 2005/0071632 A1 | 3/2005 | Pauker et al. |
| 2006/0253458 A1 | 11/2006 | Dixon et al. |
| 2006/0282887 A1 | 12/2006 | Trumper et al. |
| 2008/0005223 A1 | 1/2008 | Flake et al. |
| 2008/0109473 A1 | 5/2008 | Dixon et al. |
| 2009/0044024 A1 | 2/2009 | Oberheide et al. |
| 2010/0005291 A1 | 1/2010 | Hulten et al. |
| 2010/0037324 A1 | 2/2010 | Calum et al. |
| 2010/0058468 A1 | 3/2010 | Green et al. |
| 2010/0077445 A1 | 3/2010 | Schneider et al. |
| 2011/0067101 A1 | 3/2011 | Seshadri et al. |
| 2011/0145923 A1 | 6/2011 | Largman et al. |
| 2011/0145926 A1 | 6/2011 | Dalcher et al. |
| 2011/0191851 A1 | 8/2011 | Largman et al. |
| 2011/0225655 A1 | 9/2011 | Niemelä et al. |
| 2011/0246753 A1 | 10/2011 | Thomas |
| 2013/0247129 A1 | 9/2013 | Heron et al. |
| 2016/0337382 A1 | 11/2016 | Thomas |
| 2018/0032727 A1 | 2/2018 | Thomas |
| 2020/0117801 A1 | 4/2020 | Thomas |

OTHER PUBLICATIONS

USPTO, "U.S. Appl. No. 15/729,306 Non-Final Office Action dated Sep. 10, 2018", 19 pages.
USPTO, "U.S. Appl. No. 15/729,306 Notice of Allowance dated Aug. 30, 2019", 9 pages.
USPTO, "U.S. Appl. No. 16/692,599 Final Office Action dated Jun. 17, 2021", 24 pages.
USPTO, "U.S. Appl. No. 16/692,599 Non-Final Office Action dated Mar. 9, 2021", 21 pages.
USPTO, "U.S. Appl. No. 16/692,599 Notice of Allowance dated Sep. 29, 2021", 10 pages.
USPTO, "U.S. Appl. No. 12/751,087, Final Office Action dated Jan. 11, 2013", 9 pages.
USPTO, "U.S. Appl. No. 12/751,087, Final Office Action dated Oct. 15, 2014", 10 pages.
USPTO, "U.S. Appl. No. 12/751,087, Final Office Action dated Oct. 22, 2015", 11 pages.
USPTO, "U.S. Appl. No. 12/751,087, Non-Final Office Action dated May 7, 2014", 10 pages.
USPTO, "U.S. Appl. No. 12/751,087, Non-Final Office Action dated Jun. 11, 2015", 11 pages.
USPTO, "U.S. Appl. No. 12/751,087, Non-Final Office Action dated Jul. 17, 2012", 9 pages.
USPTO, "U.S. Appl. No. 12/751,087, Notice of Allowance dated Apr. 26, 2016", 8 pages.
USPTO, "U.S. Appl. No. 15/194,847, Non-Final Office Action dated Apr. 5, 2017", 16 pages.
USPTO, "U.S. Appl. No. 15/194,847 Notice of Allowance dated Sep. 15, 2017", 8 pages.

USE OF AN APPLICATION CONTROLLER TO MONITOR AND CONTROL SOFTWARE FILE AND APPLICATION ENVIRONMENTS

CROSS-REFERENCE TO RELATED APPLICATIONS

This application is a continuation of U.S. patent application Ser. No. 16/692,599 filed Nov. 22, 2019, which is a continuation of U.S. patent application Ser. No. 15/729,306 filed Oct. 10, 2017 (now U.S. Pat. No. 10,515,211), which is a continuation of U.S. patent application Ser. No. 15/194,847 filed Jun. 28, 2016 (now U.S. Pat. No. 9,852,292), which is a continuation of U.S. patent application Ser. No. 12/751,087 filed Mar. 31, 2010 (now U.S. Pat. No. 9,390,263), where the entire contents of each of these applications are incorporated herein by reference.

BACKGROUND

Field

The present invention is related to a security system that may be used to determine an appropriate application, application environment, and/or access or security control measure based at least in part on using an application controller program to evaluate a file's reputation information.

Description of the Related Art

Computer security is increasingly important and protecting files and computer systems from malware containing files has become increasingly difficult. A need exists to improve file security and malware protection systems.

SUMMARY

An aspect of the present invention relates to the treatment and management of files based on an understanding of their history and/or reputation. The invention, in certain embodiments, involves acquiring an understanding of a file's reputation, possibly based on a number of factors or just an understanding of whether it came from a trusted source, and then opening the file through a software application that treats the file in accordance with its reputation. The software application may be chosen and/or launched through an application manager once the file's reputation is understood. For example, the application manager may understand that a file has been received from the Internet and thus judge its reputation as 'suspect.' Once judged as suspicious, the application manager may cause the file to be opened by a software application that is adapted to manage suspicious files. This software application may also operate in a virtual space that is separated from more secure spaces of a computer or computer network to prevent possible problems that may be caused by the suspicious file. The application manager may treat a trusted file in a similar manner, by choosing an application based on the trusted nature of the file for opening the file. For example, if a file was generated by a trusted program and only communicated through an intranet, the file may be considered 'trusted' or of a high reputation. In this event, the application manager may choose a software application adapted to manage trusted files to open the trusted file. This software application may also be in a virtual environment, but more likely it is in a less restrictive environment because there is no apparent reason to keep the file separated from other environments in the computer or computer network because of the file's trusted nature.

In addition to choosing a software application, instance of a software application, or environment for the management of the file, the application controller may be used to further manage the file. For example, the application controller may be used to attach to or otherwise associate information with the file such that the file's reputation can be further assessed. The application controller may also manage where the file can go. For example, an application adapted to treat suspicious files may not have the ability to send the file to environments within the computer or computer network that are not set up to manage suspicious files. Similarly, an application adapted to manage trusted files may not be able to send a file out through the Internet or other such open network. Or it may not be able to do so without providing a warning or associating some information about the transmission.

In embodiments of the present invention, a framework for an extensible, file-based security system may be used to determine an appropriate application, application environment, and/or access or security control measure based at least in part on a file's reputation. A file's reputation may be recorded and stored, at least in part, in metadata or some other form of information that can be associated with the file (hereinafter, we will generally refer to this type of information as metadata, but it should be understood that we intend the term "metadata" to generally refer to data that is associated with other data, a file, etc.). Metadata may define access and security parameters, or some other parameter, of a file. The access, security or other parameters recorded in the metadata may conform to and/or implement a corporate policy. The metadata may be stored in association with the file, appended to the file, linked to the file in a database or plurality of databases (including a remote database or plurality of databases), or otherwise encoded to relate to the file in such a manner that the metadata and its related file may be read together or near-simultaneously. The metadata may be used to control the access and security settings of the file and to require that only an approved method of gaining access to the file, or any of the file's contents, is used, and that the method and use of the file is in accord with the access and security parameter definitions in the metadata which embody the corporate policy.

In embodiments, in response to the selection of a file, an application controller may be used to select a software application from two or more software applications to open the selected file, based at least in part on the selected file's reputation. If launched, a software application may be configured to open the file in an environment, such as a virtual machine, quarantined environment, and the like, that is appropriate for the file based at least in part on the reputation information that is associated with the file. In embodiments, a software application may be a secure software application configured to manage secure files, or an insecure software application configured to manage insecure files. The software application may be selected and may launch a selected file based at least in part on the reputation information that is associated with the file. The selected file, and all communications relating to the selected software application, may be managed according to the selected software application's secure or insecure configuration.

In embodiments, an application controller software program may be used to select a software application to launch a file, and to select an appropriate environment or virtual environment in which to launch the software application.

The application controller may be associated with a plurality of machines, including virtual machines in which a file may be launched. The application controller may identify, store, update, modify, create, read, or otherwise manipulate reputation information that is associated with the file (e.g., reputation metadata), including all subsequent files that are created and/or modified by a selected application. The reputation information may be stored within the application controller, or remotely stored in a database independent of the application controller, but which is accessible by the application controller. The reputation information may be stored in association with the file. The application controller may manage, evaluate, analyze, read, and store communications that are associated with a file. In embodiments, communications that are associated with a file may include network communications, device communications (e.g., USB memory device), network access communications, file access communications, process access communications, memory access communications, or some other type of communication. In embodiments, the reputation information that is associated with a file may be metadata relating to the file format of the selected file, the originating location of the selected file (e.g. an Internet URL, a location on an intranet, a server address, an IP address, a UDP address, a memory location, a disk drive, a folder path, a CPU, a plurality of locations, etc.), one or more prior locations where the selected file was previously located, or some other type of reputation information. Reputation information may be metadata relating to an application that may be used to open the file.

In embodiments, in response to an attempted access of a selected file, the application controller may select a software application from at least two software applications to open the selected file based on the selected file's reputation. The at least two software applications may be configured to open the file if launched, wherein one of the at least two software applications is a secure software application configured to manage secure files and one of the at least two software applications is an insecure software application configured to manage insecure files. Following the selection of an appropriate software application to use to open the file, the selected software application may be launched in order to open the selected file. The secure application and/or insecure application may be launched in a first machine, a second machine, or a plurality of machines, including but not limited to virtual machines, machines running in a quarantined environment, machines running with restricted operational privileges and capabilities, and the like. The application controller may be used to manage the selected file and all communications relating to the selected software application in accordance with the selected software application's secure or insecure configuration which may be based at least in part on the selected file's reputation. In embodiments, communications may include network communications, device communications (e.g., USB memory device), network access communications, file access communications, process access communications, memory access communications, or some other type of communication.

In embodiments, in response to an attempted access of a selected file, the application controller may select a software application from at least two software applications to open the selected file based on the selected file's reputation. The at least two software applications may be configured to open the file if launched, wherein one of the at least two software applications is a secure software application configured to manage secure files and one of the at least two software applications is an insecure software application configured to manage insecure files. Following the selection of an appropriate software application to use to open the file, the selected software application may be launched in order to open the selected file. The secure application and/or insecure application may be launched in a first machine, a second machine, or a plurality of machines, including but not limited to virtual machines, machines running in a quarantined environment, machines running with restricted operational privileges and capabilities, and the like. The application controller may enable the selected application to further associate reputation information with the selected file such that the selected file is maintained in a condition that directs how it should be treated in the future. This may include, but is not limited to, updating, recording, and/or storing reputation metadata and associating the metadata with the file. In another example embodiment, the application controller may cause the selected application to associate similar reputation information, as that for the selected file, with a second file that is interacted with by the selected software application. Further, the selected software application may associate reputation information with all files that are modified and/or created by the selected software application, including at least in part, reputation information matching that of the selected file.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Figure 1:
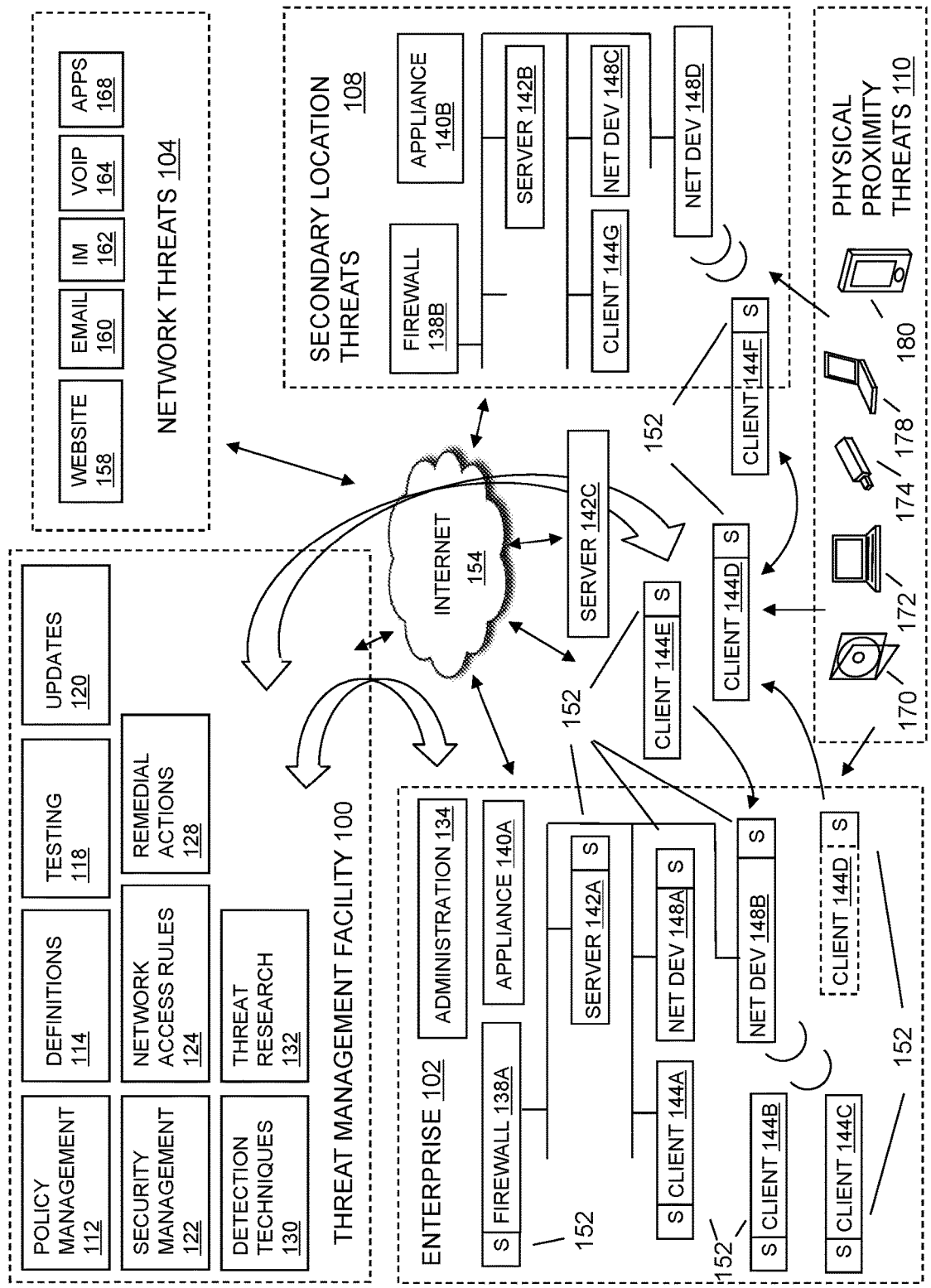
FIG. 1 depicts a block diagram of a threat management facility providing protection to an enterprise against a plurality of threats.

FIG. 1 depicts a block diagram of a threat management facility providing protection to an enterprise against a plurality of threats. An aspect of the present invention relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the internet 154. From both technical and user perspectives, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, such as the server facility 142, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include client facilities 144 that have moved into network connectivity not directly associated or controlled by the enterprise facility 102. Threats to client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide a policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility 144 access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a stand-alone application, may be part of the network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. In addition, a policy management facility 112 may also require update management (e.g. as provided by the update facility 120 herein described), as the enterprise facility 102 requirements for policies change enterprise facility 102, client facility 144, server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able to discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, administration facility 134, firewall 138, gateway, hubs and routers 148, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like (such as a user's desktop computer as an end-point computer), a firewall as a data evaluation end-point computer system, a laptop as a mobile end-point computer, a PDA as a hand-held end-point computer, a mobile phone as an end-point computer, or the like. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148A or wireless network facilities 148B. Client facilities 144 connected to the enterprise facility 102 network via a wired facility 148A or wireless facility 148B may receive similar protection, as both connection types are ultimately connected to the same enterprise facility 102 network, with the same end-point computer security facility 152, and the same threat protected enterprise facility 102 environment. Mobile wireless facility clients 144B-F, because of their ability to connect to any wireless 148B,D network access point, may connect to the internet 154 outside the enterprise facility 102, and therefore outside the threat-protected environment of the enterprise facility 102. In this instance the mobile client facility 144B-F, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144D-F that has an embedded end-point computer security facility 152, such as by providing URI filtering in personal routers, using a web appliance as a DNS proxy, or the like. Mobile client facilities 144D-F that are components of the enterprise facility 102 but temporarily outside connectivity with the enterprise facility 102 network, may be provided with the same threat protection and policy control as client facilities 144 inside the enterprise facility 102. In addition, mobile client facilities 144B-F may receive the same interactions to and from the threat management facility 100 as client facilities 144 inside the enterprise facility 102, where mobile client facilities 144B-F may be considered a virtual extension of the enterprise facility 102, receiving all the same services via their embedded end-point computer security facility 152.

Interactions between the threat management facility 100 and the components of the enterprise facility 102, including mobile client facility 144B-F extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including web sites 158, e-mail 160, IM 162, VoIP 164, application software, and the like. These threats may attempt to attack a mobile enterprise client facility 144B-F equipped with an end-point computer security facility 152, but in embodiments, as long as the mobile client facility 144B-F is embedded with an end-point computer security facility 152, as described above, threats may have no better success than if the mobile client facility 144B-F were inside the enterprise facility 102.

However, if the mobile client facility 144 were to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144F is in a secondary location 108 or connecting wirelessly to a non-enterprise facility 102 wireless internet connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards an extensible, file-based security system that may be used to determine an appropriate application, application environment, and/or access or security control measure based at least in part on using an application controller program to evaluate a file's reputation information. It should be understood that the following embodiments may be managed through a threat management facility 100 along with other services, such as those described herein.

In embodiments of the present invention, a framework for an extensible, file-based security system may be used to determine an appropriate application, application environment, and/or access or security control measure based at least in part on a file's reputation. A file's reputation may be recorded and stored, at least in part, in metadata. Metadata may define access and security parameters, or some other parameter, of a file. The access, security or other parameters recorded in the metadata may conform to and/or implement a corporate policy. The metadata may be stored in association with the file, appended to the file, linked to the file in a database or plurality of databases (including a remote database or plurality of databases), or otherwise encoded to relate to the file in such a manner that the metadata and its related file may be read together or near-simultaneously. The metadata may be used to control the access and security settings of the file and to require that only an approved method of gaining access to the file, or any of the file's contents, is used, and that the method and use of the file is in accord with the access and security parameter definitions in the metadata which embody the corporate policy.

In embodiments, in response to the selection of a file, an application controller may be used to select a software application from two or more software applications to open the selected file, based at least in part on the selected file's reputation. If launched, a software application may be configured to open the file in an environment, such as a virtual machine, quarantined environment, and the like, that is appropriate for the file based at least in part on the reputation information that is associated with the file. In embodiments, a software application may be a secure software application configured to manage secure files, or an insecure software application configured to manage insecure files. The software application may be selected and may launch a selected file based at least in part on the reputation information that is associated with the file. The selected file, and communications relating to the selected application, may be managed according to the selected software application's secure or insecure configuration.

Figure 2:
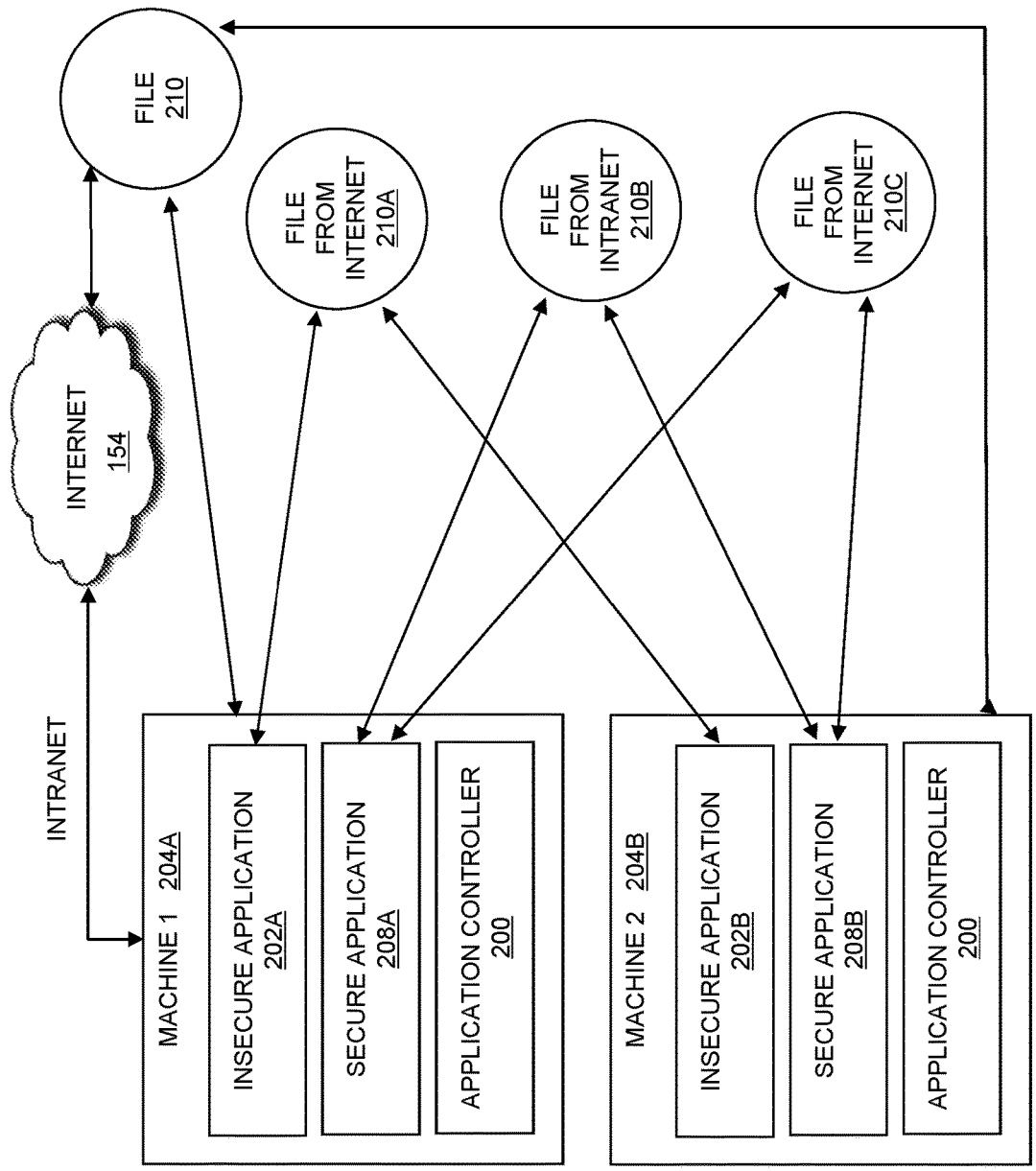
FIG. 2 depicts a simplified framework for using an application controller to assess a software file and direct the launch of an appropriate software application based at least in part on reputation information associated with the file.

Referring to FIG. 2, in embodiments of the present invention, an application controller software program 200 may be used to select a software application to launch a file, and to select an appropriate environment or virtual environment in which to launch the software application. The application controller may be associated with a plurality of machines (204A, 204B), including virtual machines in which a file (210, 210A, 210B, 210C) may be launched. The application controller 200 may identify, store, update, modify, create, read, or otherwise manipulate reputation information that is associated with the file 210 (e.g., reputation metadata). The reputation information may be stored within the application controller, or remotely stored in a database independent of the application controller, but which is accessible by the application controller, and/or stored in the file's metadata store if that is part of the format of the file or facility of the operating system to store metadata associated with the file. The application controller 200 may manage, evaluate, analyze, read, and store network communications that are associated with an application (e.g., 202A; 208A; 202B; 208B). Communications may include, but are not limited to, network access communications, file access communications, process access communications, memory access communications, device communications (e.g., USB memory stick), or some other type of communication. In embodiments, the reputation information that is associated with a file 210 may be metadata relating to the file format of the selected file 210, the originating location of the selected file (e.g. an Internet URL, a location on an intranet, a server address, an IP address, a UDP address, a memory location, a disk drive, a folder path, a CPU, a plurality of locations, etc.), one or more prior locations where the selected file 210 was previously located, or some other type of reputation information. Reputation information may be metadata relating to an application that may be used to open the file 210.

In embodiments, in response to an attempted access of a selected file, the application controller 200 may select a software application from at least two software applications (202A, 202B, 208A, 208B) to open the selected file based on the selected file's reputation. The at least two software applications (202A, 202B, 208A, 208B) may be configured to open the file if launched, wherein one of the at least two software applications (202A, 202B, 208A, 208B) is a secure software application 208A or 208B configured to manage secure files and one of the at least two software applications (202A, 202B, 208A, 208B) is an insecure software application 202A or 202B configured to manage insecure files. Following the selection of an appropriate software application to use to open the file 210, the selected software application may be launched in order to open the selected file. The secure application 208A or 208B and/or insecure application 202A or 202B may be launched in a first machine 204A, a second machine 204B, or a plurality of machines, including but not limited to virtual machines, machines running in a quarantined environment, machines running with restricted operational privileges and capabilities, and the like. The application controller 200 may be used to manage the selected file 210 and all communications relating to an application (e.g., 202A; 208A; 202B; 208B) in accordance with the selected software application's secure or insecure configuration. Communications may include, but are not limited to, network access communications, file access communications, process access communications, memory access communications, USB device, or some other type of communication device.

In embodiments, in response to an attempted access of a selected file, the application controller 200 may select a software application from at least two software applications (202A, 202B, 208A, 208B) to open the selected file 210 based on the selected file's reputation. The at least two software applications (202A, 202B, 208A, 208B) may be configured to open the file 210 if launched, wherein one of the at least two software applications (202A, 202B, 208A, 208B) is a secure software application 202A 208A or 208B configured to manage secure files and one of the at least two software applications (202A, 202B, 208A, 208B) is an insecure software application 202A or 202B configured to manage insecure files. Following the selection of an appropriate software application to use to open the file 210, the selected software application may be launched in order to open the selected file. The secure application 208A or 208B and/or insecure application 202A or 202B may be launched in a first machine 204A, a second machine 204B, or a plurality of machines, including but not limited to virtual machines, machines running in a quarantined environment, machines running with restricted operational privileges and capabilities, and the like. The application controller 200 may enable the selected application to further associate reputation information with the selected file 210 such that the selected file 210 is maintained in a condition that directs how it should be treated in the future. This may include, but is not limited to, updating, recording, and/or storing reputation metadata and associating the metadata with the file 210. In another example embodiment, the application controller may cause the selected application to associate similar reputation information, as that for the selected file 210, with a second file that is interacted with during the launch of the selected software application, or any file the application modifies or creates.

Still referring to FIG. 2, in embodiments, an application controller 200 may execute on a machine 204 (e.g. a server, a desktop, virtual machine, or some other computer facility). The application controller 200 may be associated with one or more applications, such as, but not limited to, Word, Internet Explorer, iTunes, Acrobat Reader, Yahoo! Messenger, or some other software application. The machine 204 may be able to access one or more resources. A resource may be access to the Internet 154, access to one or more intranets, access, one or more CPUs, one or more disk drives, one or more hard drives, system resources, network resources, machine 204 resources, or other resources. Resources may include, but are not limited to, another application (e.g., a server application). Resources may be areas of a local file system, areas of a registry, internal objects (e.g., COM objects), portions of a network (Internet or intranet), or some other type of resource. The machine 204 may access one or more files 210 through one or more such resources. For example, a machine 204 may download a file 210 from the Internet 154 and store the file to a hard drive attached to the machine 204. In another example, a machine 204 may access a file 210 stored on a network drive. In embodiments, an application may be run in virtual environment, for example, on a virtual machine or some other virtual environment. In embodiments, the virtual environment may be utilized to control access to one or more resources accessible by the machine 204. In some embodiments, the application controller 200 may control application instances. In example embodiments, the application controller 200 may control separate application windows; the application controller 200 may control both application instances and separate application windows; the application controller 200 may control the operating system, the application controller 200 may control other execution environments.

In embodiments, an application controller 200 may determine an appropriate application to access a selected file 210 based on a reputation associated with the selected file 210. For example, the application controller 200 may determine to run a selected file 210 in a secure application 208. Alternatively, the application controller 200 may determine to run a selected file 210 in an insecure application 202. In embodiments, a user may define one or more rules for directing the application controller 200. Rules may, for example, derive from a corporate policy regarding software file usage. For example, a user may define a rule directing the application controller 200 to open text files 210 selected from the Internet 154 in Wordpad that is operating as a secure application 208. In embodiments, one or more applications may be cached locally on the machine 204 as an optimization.

In embodiments, the application controller 200 may determine to run a secure application 208 because the application controller 200 determines that the selected file 210 has no reputation, or only partially complete reputation metadata. In some embodiments, the application controller 200 may determine to run a secure application 208 because the application controller 200 determines that the reputation indicates that the selected file 210 is from an insecure zone, such as, but not limited to, the Internet 154, an unknown device, another machine 204, a thumb drive, or some other insecure location. The application controller 200 may determine to run a secure application 208 because the application controller 200 determines that the reputation indicates the selected file 210 is not from a trusted source, such as, but not limited to a trusted user, a trusted intranet, a trusted group, a trusted machine 204 or some other source, such as a trusted application.

In embodiments, the secure application 208 may have limited access to resources available on the machine 204. The secure application 208 may not be able to access resources such as, but not limited to, network drives, the Internet 154, other machines 204 and other resources. For example, the application controller 200 may run a selected file 210 with an unsafe reputation in a secure application 208 that only has access to the machine 204 CPU and RAM, but not any drives on the machine 204, nor the Internet 154. In another example, the application controller 200 may run a secure application 208 with access to the Internet 154, but without access to any other resources, other than those required to run the secure application 208. In another example, the application controller 200 may run a secure application 208 with access to an internal business server with access to additional system resources, but without access to the Internet 154.

In some embodiments, the application controller 200 may determine to run an insecure application 202 because the application controller 200 determines that the selected file 210 is secure. In some embodiments, the insecure application 202 may have access to resources available on the machine 204. In some embodiments, the insecure application 202 may have no restrictions on the resources available to the machine 204. In some embodiments, the insecure application 202 may access the same resources available to the user of the machine 204. In embodiments, the application controller 200 may determine to run an application in a mode other than secure or insecure. Such other mode may be a customized mode, a test mode or some other mode. A customized mode may be defined by a user, a machine 204 administrator, a system administrator, or some other entity that can define a mode. A test mode, for example, may start as a secure application 208 and escalate to an insecure application 202 by granting the application access to additional resources. As another example, an application may start as an insecure application 202 and change to a secure application 208 upon the application controller 200 determining that there is a threat in the file 210. In embodiments, there may be multiple definitions of secure and insecure modes depending on policy, which may be tied to reputation information.

In embodiments, the application controller 200 may protect data by using a reputation to contain threats and prevent data leaks. In some embodiments, the application controller 200 may detect attempted data transfers from an insecure application 202 to a secure application 208, intercept the transfers and clean the insecure data. For example, the application controller 200 may detect a transfer of data from a file run in an insecure application 202, intercept the transfer and execute a cleaning action (e.g. quarantine virus infections, quarantine malware, remove confidential information, etc.) on the data to be transferred into the secure application 208. In some embodiments, the application controller 200 may protect against threats (e.g. malware, viruses, adware, etc.) prevent data leaks by updating a selected file's 210 reputation with a danger flag, or other alert.

As depicted in FIG. 2, for example, the application controller 200 associated with the machine 1 204A may run a file 210C from the Internet 154 in a secure application 208A where the reputation indicates that the file 210C is from an unknown source. The application control 200 associated with the machine 2 204B may also run the file 210C in a secure application 208B for the same reason. The application controllers 200A-B may run the file 210B from the intranet in secure applications 208A-B to prevent the data in 210B from being leaked to the Internet 154.

Figure 3:
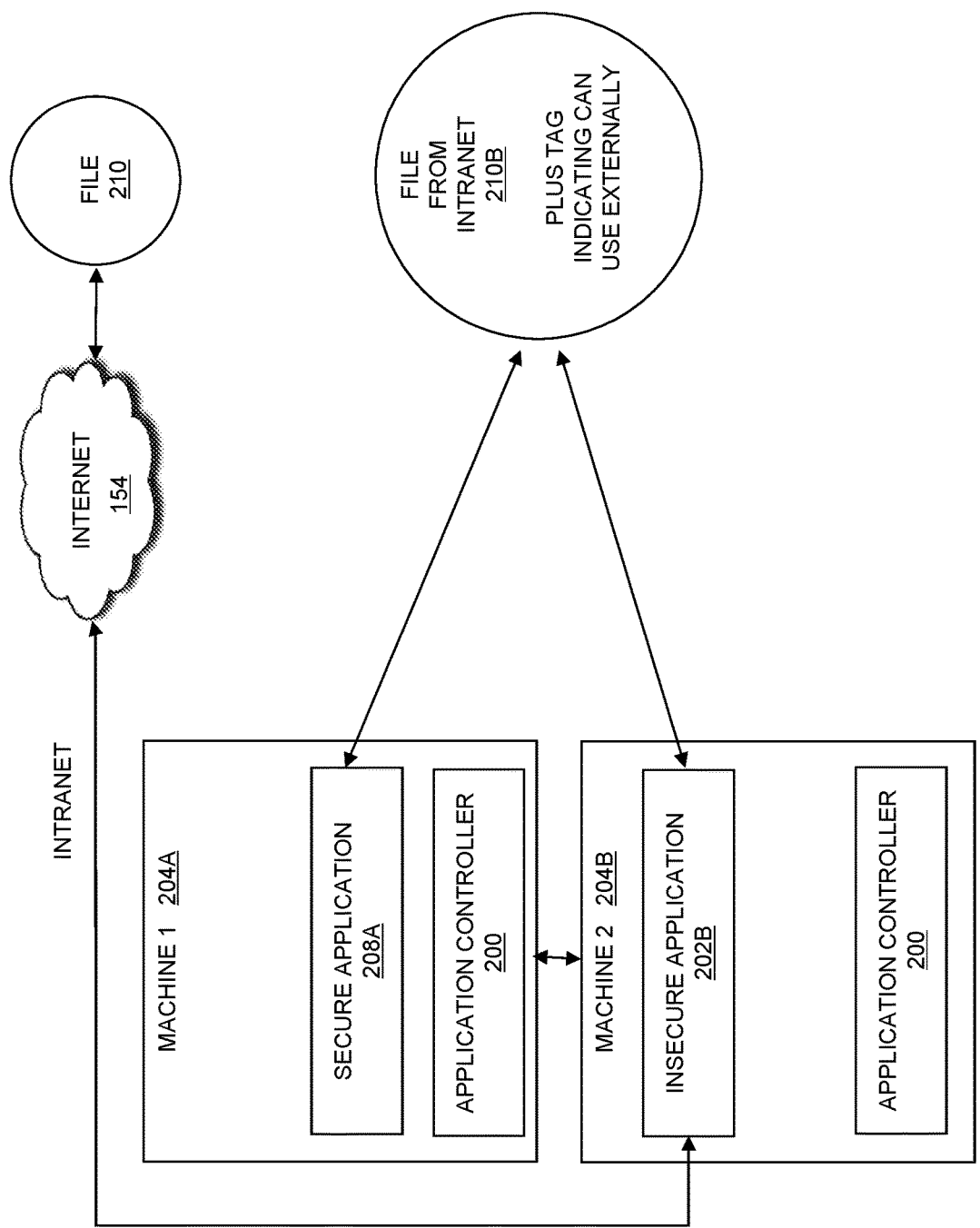
FIG. 3 depicts using an application controller in a DLP scenario.

Referring to FIG. 3, the application controller 200 associated with a machine 2 204B may run a file 210 in an insecure application 202 and share the file with another machine 204A. that runs the same file in a second environment using a secure application 208A, for example, after the application controller has performed some action on the file 210 rendering the file appropriate for running in a secure application environment. In embodiments, the application controller 200 may run a file 210B from an intranet in an insecure application 202B and may share the file 210B with a second, unprotected machine 204A where the file 210B has a reputation indicating permission for external use. For example, an application controller 200 may run an intranet file 210B relating to a press release in an insecure application 202B so that the press release may be posted on the Internet 154.

Figure 4:
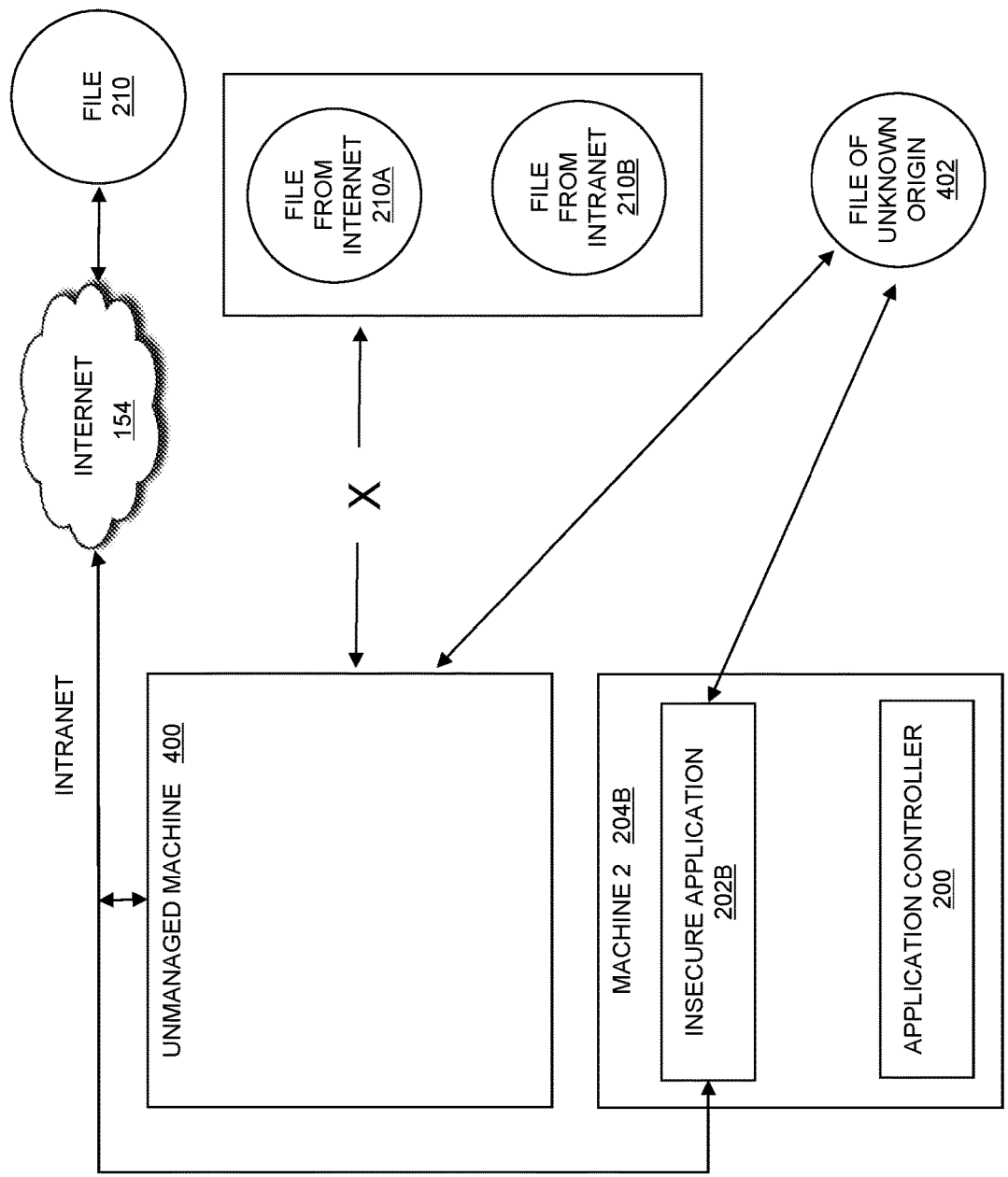
FIG. 4 depicts the use of an application controller in an environment that includes an unmanaged machine.

Referring to FIG. 4, a machine 400 without an application controller 200, such as an unmanaged machine, or a machine lacking a designation within the system, may not access file 210 reputations. For example, an unmanaged machine 400 without an application controller may not be able to determine which files are from the Internet 210A or from an intranet 210B; all files accessed by such machine 204A may be designated to be of unknown origin 402 and may be required to be opened only by an insecure application 202B.

Figure 5:
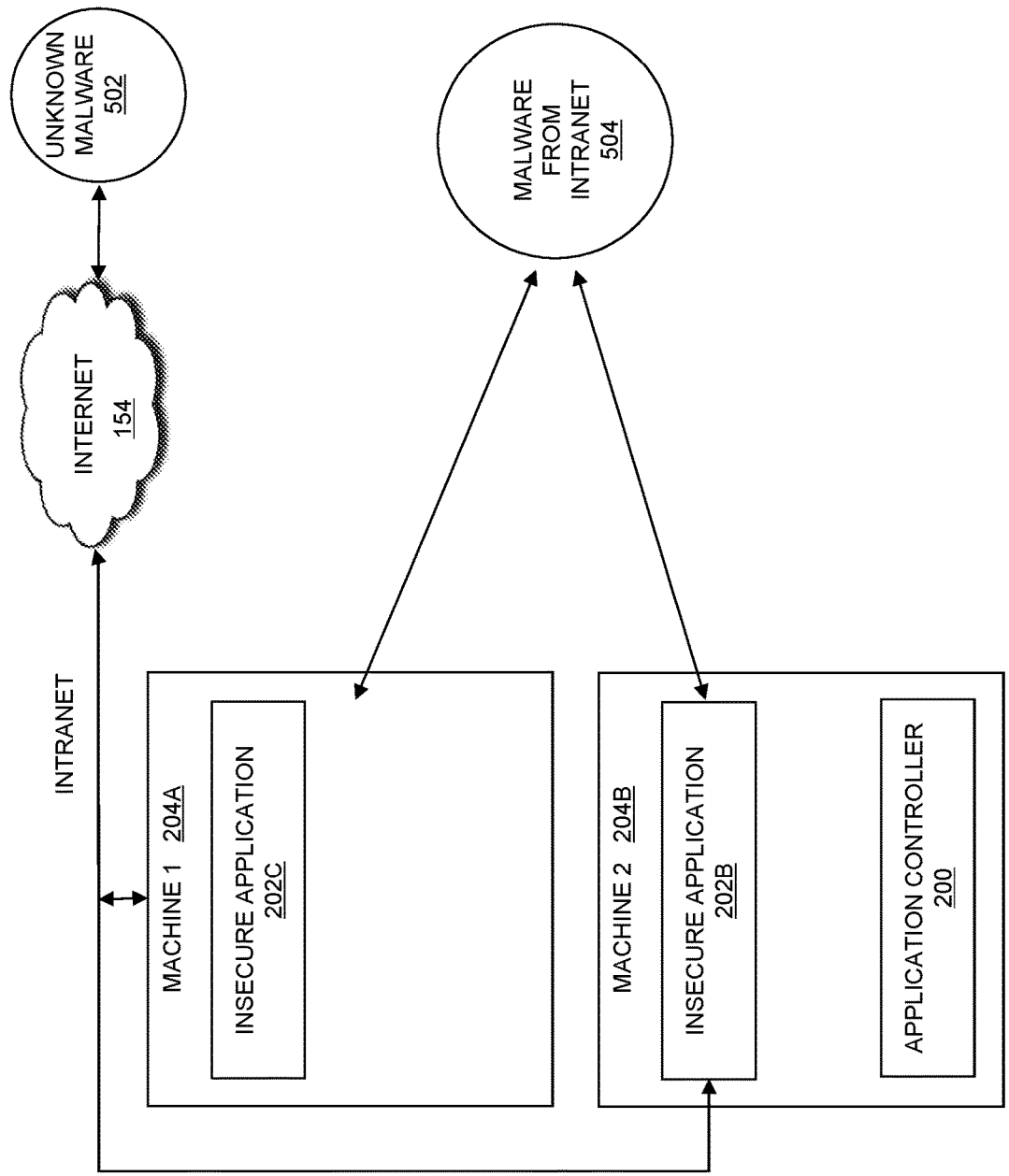
FIG. 5 depicts the use of an application controller in the presence of an unknown malware.

Referring to FIG. 5, an application controller may be used to protect against damage from unknown malware 502, such as that coming to a system from the internet 154, or malware 504 that has its origin within an intranet. As disclosed herein, in embodiments, an application controller 200 may run a selected file 210 in an insecure application 202B with restricted access to resources. For example, a day zero malware file 502 may be received by both a machine 1 204A without an application controller and a machine 2 204B with an application controller. For machine 1 204A, protection provided by existing systems would not be able to detect the day zero malware 502A and the insecure application 202A will run the application without additional protections. For machine 2 204B, the application controller 200 may also run the day zero malware file 502A in an insecure application 202B. However, the application controller 200 may run the insecure application 202B without access to other resources (e.g. run in a separate virtual environment, run in a sandbox environment, run without access to some sensitive resources or run in some other protected manner) and protect machine 2 204B from the malware threat. Other files may also be protected from the threat because the application will not have access to the files. Additionally, the application controller 200 may update the reputation for the zero day malware 502A to identify the threat.

Figure 6:
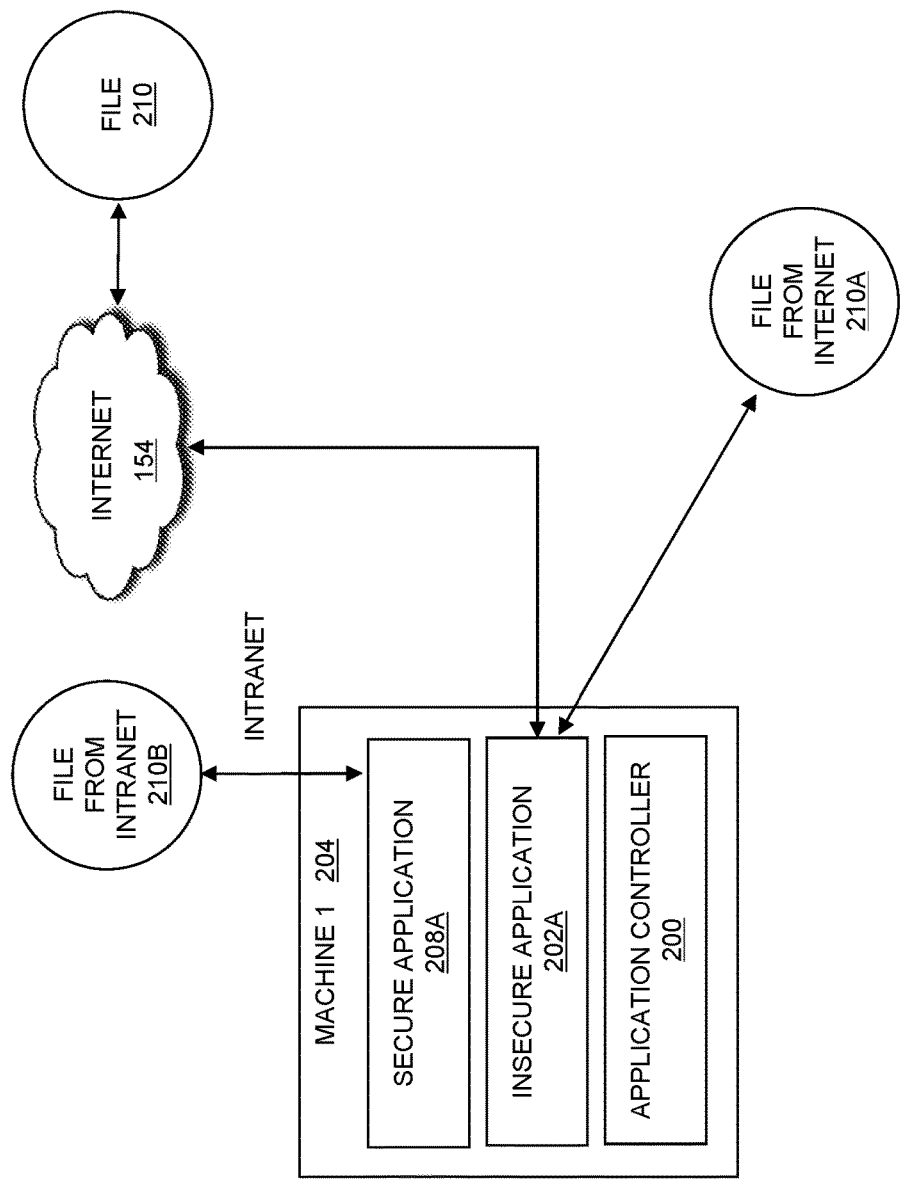
FIG. 6 depicts the use of an application controller in a home use environment.

Referring to FIG. 6, in embodiments, an application controller 200 may run on a single machine 204, and or computing environment consisting of a single machine. For example, a home user may run the application controller 200 on his home computer, laptop, or some other client device, fully enabled with the features of the application controller 200 as described elsewhere herein. In an example embodiment, a policy may be created that allows businesses applications (secure) only to be used to access business files, and allow a user's home applications to only be used to access non-business files.

Figure 7:
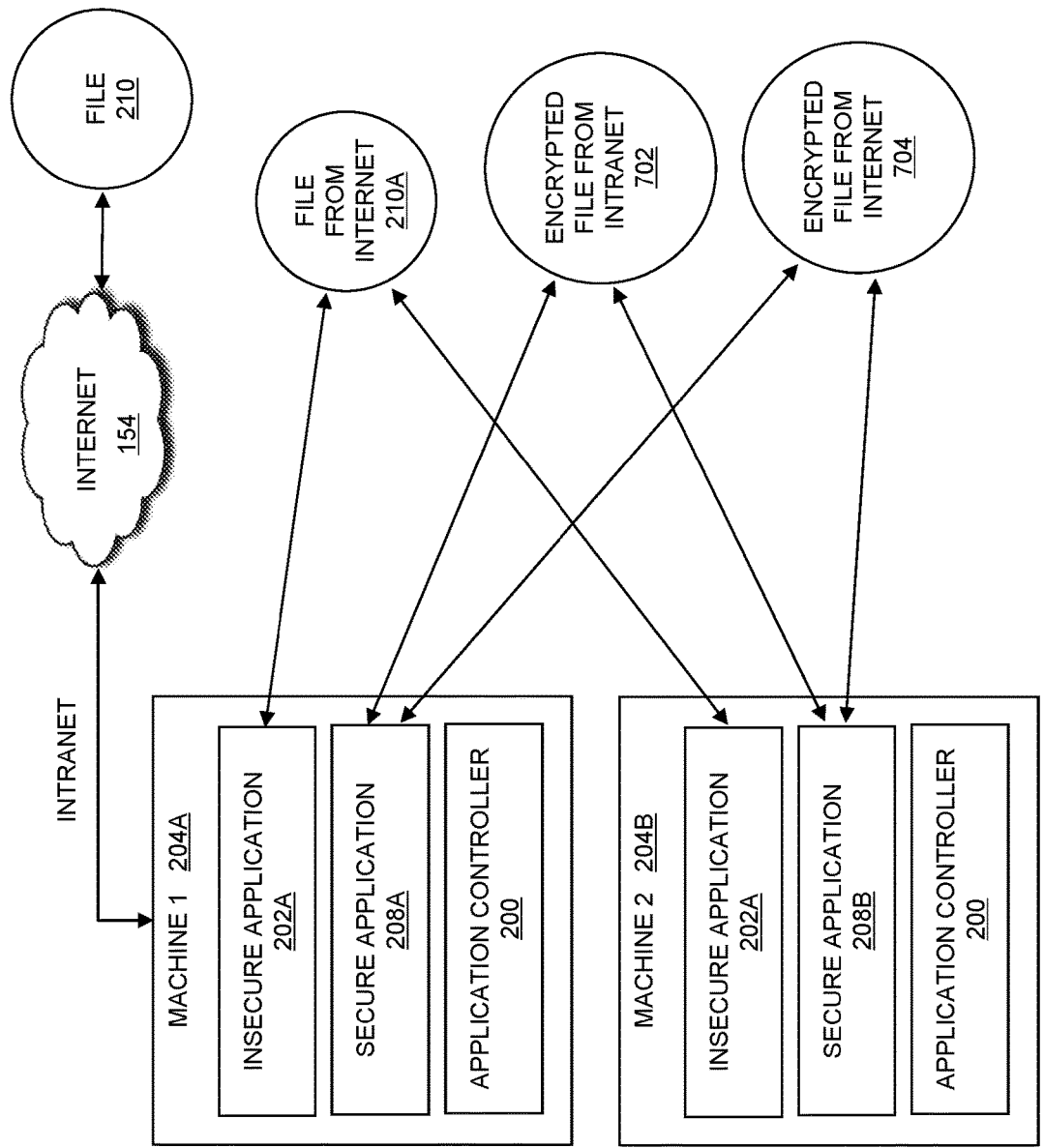
FIG. 7 depicts the use of an application controller in association with encryption.

Referring to FIG. 7, in embodiments, a file 210 from a secure application 208A may be encrypted to restrict access to the file 210. For example, a file 702 from an intranet may be encrypted by a secure application 208A and access only granted to the file 702 through another secure application 208B with the necessary decryption key. In another example, a file 704 from the Internet may be encrypted by a secure application 208A and access only granted to the file 704 through another secure application 208B with the necessary decryption key. In some embodiments, an unmanaged machine 204 may not be able to decrypt such encrypted files 210.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product for operating an application controller on an endpoint in an enterprise network, the computer program product embodied in a non-transitory computer readable medium that, when executing on one or more computers, performs the steps of:
    in response to a selection of a file, retrieving a reputation of the file stored in metadata for the file, wherein the reputation includes at least one security parameter for the file and wherein the reputation is remotely stored in a database independent of the application controller and accessible by the application controller;
    in response to the at least one security parameter, selecting a software application with the application controller from a number of software applications on the endpoint for opening the file based on the reputation of the file and a security configuration of the number of software applications, wherein the number of software applications includes at least one insecure application for opening the file in an application environment when the file has a good reputation and at least one secure application for opening the file in the application environment when the file has a poor or unknown reputation, and, as compared to opening the file in the application environment with the at least one insecure application, the at least one secure application opens the file in the application environment with more limited access to resources of the application environment;
    launching the selected software application to open the file and access the file in accordance with the security configuration for the selected software application;
    managing use of the file by the software application with the application controller, wherein the application controller is configured to adjust resources available to the selected software application on the endpoint based on the reputation of the file; and
    escalating the selected software application to an insecure application by granting the selected software application access to additional resources of the application environment upon determination that the file has a good reputation.

2. The computer program product of claim 1, wherein the application controller is enabled to store the reputation that is associated with the file.

3. The computer program product of claim 1, wherein the application controller is configured to adjust resources available to the selected software application by managing communications related to the selected software application.

4. The computer program product of claim 3, wherein communications relating to the selected software application include a network access communication.

5. The computer program product of claim 3, wherein communications relating to the selected software application include a file access communication.

6. The computer program product of claim 3, wherein communications relating to the selected software application include a process access communication.

7. The computer program product of claim 3, wherein communications relating to the selected software application include a memory access communication.

8. The computer program product of claim 1, wherein reputation information in the metadata includes data relating to a file format.

9. The computer program product of claim 1, wherein reputation information in the metadata includes data relating to an originating location of the file.

10. The computer program product of claim 9, wherein the originating location is an Internet URL.

11. The computer program product of claim 9, wherein the originating location is an IP address.

12. The computer program product of claim 9, wherein the origination location is a third software application.

13. The computer program product of claim 12, wherein the third software application is a secure application.

14. A method for operating an application controller on an endpoint in an enterprise network, the method comprising:
    in response to a selection of a file, retrieving a reputation of the file stored in metadata for the file, wherein the reputation includes at least one security parameter for the file and wherein the reputation is remotely stored in a database independent of the application controller and accessible by the application controller;
    selecting a software application with the application controller from a number of software applications on the endpoint for opening the file based on the reputation of the file, wherein the number of software applications include at least one insecure application for opening the file in an application environment when the file has a good reputation and at least one secure application for opening the file in the application environment when the file has a poor or unknown reputation, and, as compared to opening the file in the application environment with the at least one insecure application, the at least one secure application opens the file in the application environment with more limited access to resources of the application environment;
    launching the selected software application to open the file and access the file in accordance with a security configuration for the selected software application that controls access to resources of the application environment;
    managing use of the file by the software application with the application controller;
    updating the reputation of the file; and
        changing the selected software application to an insecure software application with access to additional resources of the application environment in response to updating the reputation of the file.

15. The method of claim 14, wherein adjusting the selected software application includes increasing access to resources of the application environment by adjusting to one of the at least one insecure applications when the reputation of the file is updated to a good reputation.

16. The method of claim 14, wherein adjusting the selected software application includes decreasing access to resources of the application environment by adjusting to one of the at least one secure applications when the reputation of the file is updated to a poor reputation.

17. The method of claim 14, wherein selecting the software application includes selecting one of the at least one secure applications when the reputation of the file is unknown.

18. The method of claim 14, wherein managing use of the file by the software application includes managing access to resources of the application environment by the software application based on the reputation of the file.

19. The method of claim 14, wherein reputation includes data relating to an origin of the file.

20. An endpoint comprising:
a memory storing computer executable instructions that, when executed, provide an application controller for managing applications executing on the endpoint; and
a processor configured to:
in response to a selection of a file on the endpoint, retrieve a reputation of the file including at least one security parameter stored in a database remote from the endpoint and accessible by the application controller;
in response to the at least one security parameter, select a software application from a number of software applications on the endpoint for opening the file based on the reputation of the file and a security configuration of the number of software applications, wherein the number of software applications include at least one insecure application for opening the file in an application environment when the file has a good reputation and at least one secure application for opening the file in the application environment when the file has a poor or unknown reputation, and, as compared to opening the file in the application environment with the at least one insecure application, the at least one secure application opens the file in the application environment with more limited access to a network of the application environment;
launch the selected software application to open the file and access the file in accordance with the security configuration for the selected software application; and
change the selected software application to an insecure software application with access to additional resources of the application environment based on a change in the reputation of the file.

* * * * *